No. 680,713. Patented Aug. 20, 1901.
L. HOLCOMB.
ATTACHMENT FOR SULKY CULTIVATORS.
(Application filed June 12, 1901.)

(No Model.) 2 Sheets—Sheet 1.

Witnesses

Linus Holcomb, Inventor.
by C. A. Snow & Co.
Attorneys

No. 680,713. Patented Aug. 20, 1901.
L. HOLCOMB.
ATTACHMENT FOR SULKY CULTIVATORS.
(Application filed June 12, 1901.)
(No Model.) 2 Sheets—Sheet 2.
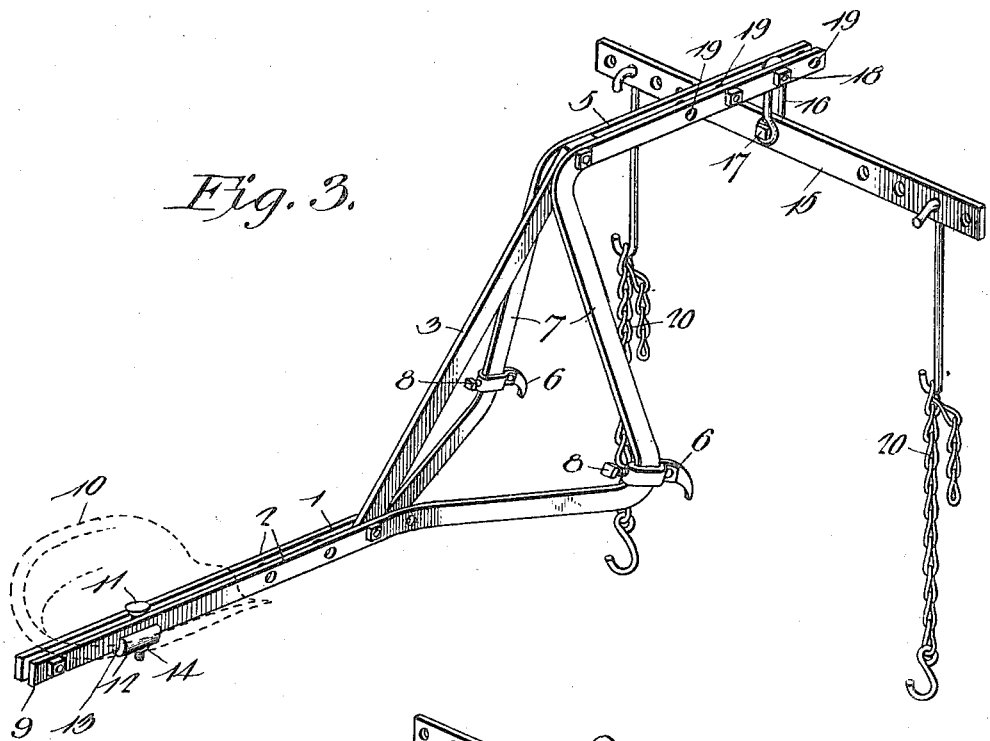
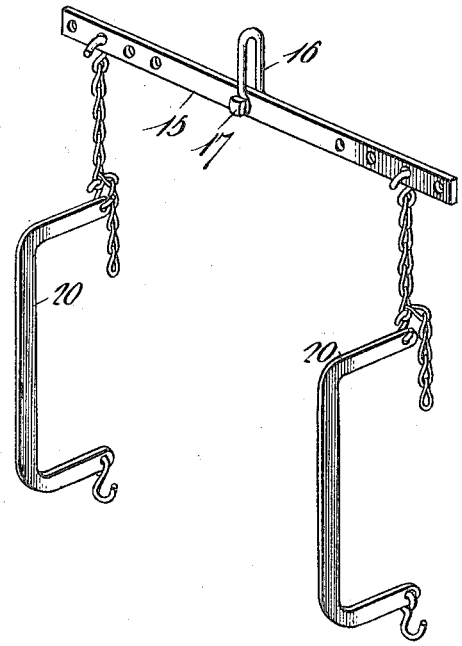
Linus Holcomb, Inventor.
by C. A. Snow & Co.
Attorneys

United States Patent Office.

LINUS HOLCOMB, OF AMBOY, ILLINOIS, ASSIGNOR OF ONE-HALF TO OSCAR F. GILLETT, OF SAME PLACE.

ATTACHMENT FOR SULKY-CULTIVATORS.

SPECIFICATION forming part of Letters Patent No. 680,713, dated August 20, 1901.

Application filed June 12, 1901. Serial No. 64,296. (No model.)

*To all whom it may concern:*

Be it known that I, LINUS HOLCOMB, a citizen of the United States, residing at Amboy, in the county of Lee and State of Illinois, have invented a new and useful Attachment for Sulky-Cultivators, of which the following is a specification.

My invention is an improved attachment for sulky-cultivators, by means of which the weight of the cultivator-beams and their attached plows is counterbalanced by that of the driver to enable the beams to be readily raised and lowered as may be required by the inequalities of the ground when the cultivator is in operation.

My invention consists in the peculiar construction and combination of devices hereinafter fully set forth and claimed.

Figure 1:
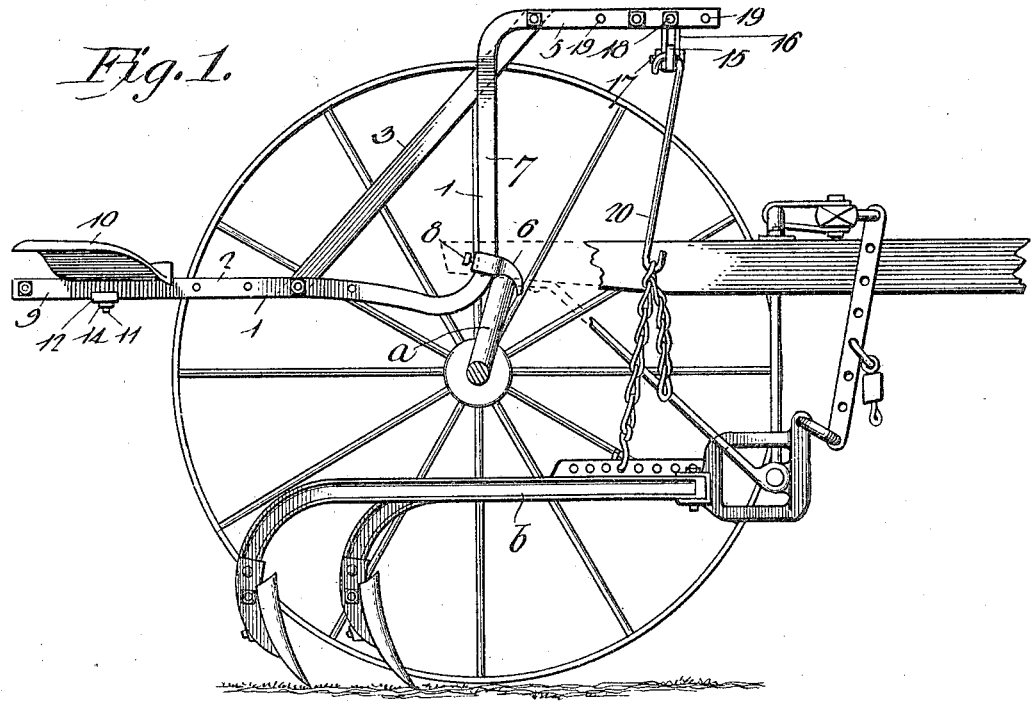
Figure 2:
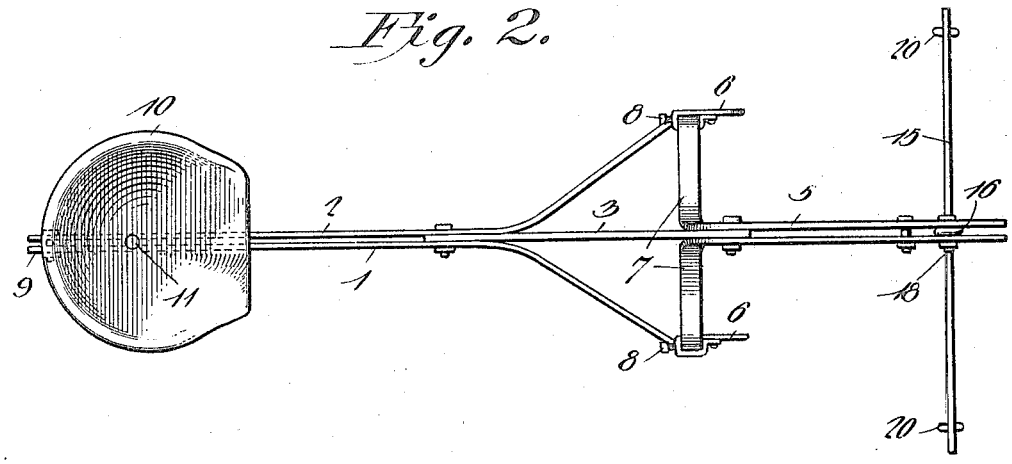

In the accompanying drawings, Figure 1 is a side elevation, partly in section, of a sulky-cultivator of usual form provided with my improved attachment. Fig. 2 is a top plan view of my improved attachment. Fig. 3 is a perspective view of the same. Fig. 4 is a detail perspective view of the balance-bar, showing a modified form of the links to connect the cultivator-beams thereto.

In the embodiment of my invention I provide a seat-supporting bar which is adapted to be attached to and readily detached from the cranked axle of a sulky-cultivator and fulcrumed thereon. The seat-supporting bar 1 is preferably formed of a pair of members 2 and a brace member 3. As here shown, the members 2, which are metallic bars of suitable dimensions, are adapted to be bolted together at their ends, and their central portions are bent laterally from each other and also bent angularly, and thereby the seat-supporting bar is provided at its front end with the elevated forwardly-extended arm 5. The ends of the brace-bar 3 are bolted between the bars 2 at the angles thereof, as shown. Clip-hooks 6 are adjustable on the upturned portions 7 of the bars 2 and may be secured at any desired adjustment by the screws 8, with which the said clip-hooks are provided. Said clip-hooks project forwardly from the upturned portions 7 of the bars 2 and are adapted to engage the upper side of the crank or arch of the axle $a$ of a sulky-cultivator, as shown in Fig. 1.

On the rearwardly-extending arm 9 of the seat-supporting bar is mounted the seat 10 for the driver, and said seat is adjustable on the said arm 9 toward and from the axle of the cultivator, on which the seat-supporting bar is fulcrumed. As here shown, the seat is attached to the arm 9 by a bolt 11, which operates in the space between the bars 2, and a clip 12, which slides on the under side of the arm 9, is longitudinally grooved on its upper side, as at 13, to fit the said arm and is secured to the bolt 11. The seat may be secured at any desired adjustment on the arm 9 by tightening the nut 14 on the lower end of said bolt.

A balance-bar 15 is suspended from the forwardly-extending arm 5 of the seat-supporting bar by a link 16, which is preferably of the form here shown, the said balance-bar being pivoted at its center to the lower end of said link by a bolt 17. The upper end of the said link passes between the bars 2 and is secured between them at any desired point by means of a bolt 18, which bolt also serves to connect the bars 2 together, as shown in Fig. 1. Those portions of the bars 2 which form the forwardly-extending arm 5 are provided with adjusting-openings 19 for the bolt 18. Hence the balance-bar may be longitudinally adjusted on the said arm 5. I employ suitable links, chains, or other suitable devices, as at 20, to connect the ends of the balance-bar to the beams $b$ of the cultivator. The said connections 20 may be attached to the balance-bar at any desired point and at any desired distance from the ends thereof and may be attached to the beams $b$ at any desired point. Hence the beams $b$ may be suspended from the seat-supporting bar by the balance-bar, and by suitably adjusting the connections 20 said beams $b$ may be caused to exactly balance each other. The driver, seated on the seat 10, places his feet on the cultivator-beams $b$, as is usual, and it will be understood from the foregoing description and by reference to the drawings, more particularly to Fig. 1 of the drawings, that by means of my improved attachment the weight of the cultivator-beams and their attached plows is counterbalanced by that of the driver and that the cultivator-beams may be readily raised and lowered by the driver and practically without exertion on his part to cause the cultivator-plows to run at any desired depth in the soil and as may be required by the inequalities of the ground.

My attachment may be readily disconnected from the cultivator by disconnecting the parts 20 from the cultivator-beams and lifting the seat-supporting bar from the cultivator-axle.

Having thus described my invention, I claim—

1. In a sulky-cultivator, the combination of a counterbalancing seat-supporting bar, a balance-bar connected thereto, and connections between said balance-bar and the cultivator-beams, whereby the latter may be caused to balance each other, and whereby the weight of the cultivator-beams and their attached plows may be counterbalanced by that of the driver, substantially as described.

2. An attachment for sulky-cultivators, comprising a seat-supporting bar having means whereby it may be fulcrumed on and readily detached from the axle of a sulky-cultivator, and connections for the attachment of the cultivator-beams to the said seat-supporting bar, substantially as described.

3. A sulky-cultivator attachment of the class described, comprising a seat-supporting bar having means to engage and fulcrum said seat-supporting bar on the axle of a cultivator, a seat adjustable on one end of said seat-supporting bar, a balance-bar adjustable on the opposite end of said seat-supporting bar and means to connect the cultivator-beams to the said balance-bar, substantially as described.

4. A sulky-cultivator attachment of the class described, comprising a seat-supporting bar formed with a rearwardly-extending arm, an angularly-disposed central portion, and an elevated forwardly-extending arm, clip-hooks on the said angularly-disposed portion of said bar, and adjustable thereon, for the purpose set forth, a seat adjustable on the rearwardly-extending arm, a balance-bar and a link to connect the same to the forwardly-extending arm, said link being adjustable on said forwardly-extending arm, substantially as described.

In testimony that I claim the foregoing as my own I have hereto affixed my signature in the presence of two witnesses.

LINUS HOLCOMB.

Witnesses:
FRED N. VAUGHAN,
JOSIAH LITTLE.